US009123133B1

(12) United States Patent
Chen et al.

(10) Patent No.: US 9,123,133 B1
(45) Date of Patent: Sep. 1, 2015

(54) METHOD AND APPARATUS FOR MOVING OBJECT DETECTION BASED ON CEREBELLAR MODEL ARTICULATION CONTROLLER NETWORK

(71) Applicant: National Taipei University of Technology, Taipei (TW)

(72) Inventors: Bo-Hao Chen, Taipei (TW); Shih-Chia Huang, Taipei (TW)

(73) Assignee: National Taipei University of Technology, Taipei (TW)

( * ) Notice: Subject to any disclaimer, the term of this patent is extended or adjusted under 35 U.S.C. 154(b) by 10 days.

(21) Appl. No.: 14/225,442

(22) Filed: Mar. 26, 2014

(51) Int. Cl.
*G06K 9/00* (2006.01)
*G06T 7/20* (2006.01)
*G06K 9/62* (2006.01)

(52) U.S. Cl.
CPC ............ *G06T 7/2006* (2013.01); *G06K 9/6255* (2013.01); *G06K 9/6267* (2013.01); *G06T 7/2013* (2013.01); *G06T 2207/10016* (2013.01); *G06T 2207/20084* (2013.01); *G06T 2207/20144* (2013.01); *G06T 2207/20148* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| 2007/0114985 A1* | 5/2007 | Latham et al. ................. 323/283 |
| 2009/0027025 A1* | 1/2009 | Latham et al. ................. 323/283 |
| 2009/0041386 A1* | 2/2009 | Mealy et al. .................. 382/298 |

OTHER PUBLICATIONS

Dongxiang Zhou and Hong Zhang, "Modified GMM Background Modeling and Optical Flow for Detection of Moving Objects," IEEE International Conference on Systems, Man and Cybernetics, Oct. 10-12, 2005, pp. 1-6.
Ahmed Elgammal, et al., "Background and Foreground Modeling Using Nonparametric Kernel Density Estimation for Visual Surveillance," Proceedings of the IEEE, vol. 90, No. 7, Jul. 2002, pp. 1-13.
Antoine Manzanera and Julien C. Richefeu, "A new motion detection algorithm based on $\Sigma$-$\Delta$ background estimation," Elsevier Science, Aug. 21, 2007, pp. 1-12.
Jong-Eun Ha and Wang-Heon Lee, "Foreground objects detection using multiple difference images," Optical Engineering, Apr. 2010, pp. 1-5.
A. Manzanera and J. C. Richefeu, "A robust and computationally efficient motion setection algorithm based on $\Sigma$-$\Delta$ background estimation.," Proceedings of the Fourth Indian Conference on Computer Vision, Graphics & Image Processing, Dec. 16-18, 2004 , pp. 1-6.
Mustafa Oral and Umut Deniz, "Centre of mass model—A novel approach to background modelling for segmentation of moving objects," Image and Vision Computing, Oct. 3, 2006, pp. 1-12.
Shih-Chia Huang and Bo-Hao Chen, "Highly Accurate Moving Object Detection in Variable Bit Rate Video-Based Traffic Monitoring Systems," IEEE Transactions on Neural Networks and Learning Systems, Dec. 2013, pp. 1-12.

* cited by examiner

*Primary Examiner* — Atiba O Fitzpatrick
(74) *Attorney, Agent, or Firm* — Jianq Chyun IP Office

(57) ABSTRACT

A method for moving object detection based on a Cerebellar Model Articulation Controller (CMAC) network includes the following steps. A time series of incoming frames of a fixed location delivered over a network is received. A CMAC network is constructed from the time series of incoming frames, where the CMAC network includes an input space, an association memory space, a weight memory space, and an output space. A current frame is received and divided into a plurality of current blocks. Each of the current blocks is classified as either a background block or a moving object block according to the CMAC network. Whether a target pixel of the moving object blocks is a moving object pixel or a background pixel is determined according to an output of the CMAC network in the output space.

14 Claims, 6 Drawing Sheets

METHOD AND APPARATUS FOR MOVING OBJECT DETECTION BASED ON CEREBELLAR MODEL ARTICULATION CONTROLLER NETWORK

INCORPORATION BY REFERENCE

This application is based upon the disclosure of the paper titled *Highly Accurate Moving Object Detection in Variable Bit Rate Video-Based Traffic Monitoring Systems* which will be published in IEEE TRANSACTIONS ON NEURAL NETWORKS AND LEARNING SYSTEMS in April 2014. The aforementioned paper is incorporated by reference for all purposes.

TECHNICAL FIELD

The present invention generally relates to a method and an apparatus for moving object detection based on a Cerebellar Model Articulation Controller (CMAC) network.

BACKGROUND

In recent years, video image detection systems have been proposed in various applications for identifying and tracking moving objects. In particular, wireless video surveillance which uses automatic detection to track a moving object has been a key technology in the management of intelligent surveillance systems. Within the field of traffic management as an example, video image detection techniques have been deployed in intelligent transportation systems (ITS) for purposes such as alleviating traffic congestions, advancing transportation safeties, and optimizing traffic flows. By accurately distinguishing vehicles from background objects, an intelligent transportation system may obtain current traffic volumes along a road or even detect and track a particular vehicle.

Conventional moving object detection methods may be classified into three main approaches: Temporal Differencing, Optical Flow, and Background Subtraction.

For the Temporal Differencing related technique, regions of motion could be detected based on pixel-wise differences between successive frames in a video stream. Such technique could be adaptive to dynamic scene changes, but yet it has a tendency to incompletely extract shapes of moving objects particularly when moving objects are motionless.

An Optical Flow related technique may estimate flow vectors of moving objects based on partial derivatives with respect to temporal and spatial coordinates from brightness values between successive frames in a video stream. However, such technique could be sensitive to noise and inefficient for traffic applications due to computational burdens.

A Background Subtraction related technique has been a commonly used technique in video surveillance and target recognitions. By the background subtraction technique, moving foreground objects would be able to be segmented from stationary or dynamic background scenes by comparing pixel differences between a current image and a reference background model of the previous image. The background subtraction related technique has been the most satisfactory method for motion detection.

Many variations of the background subtraction method have been proposed to detect moving vehicles within video sequences in an ideal bandwidth network environment. An $\Sigma$-$\Delta$ filter technique has been used in the Sigma Difference Estimation (SDE) approach to estimate two orders of temporal statistics for each pixel in a sequence in accordance with a pixel-based decision framework. Unfortunately, the SDE approach may be insufficient for complete object detections in certain complex environments. In an attempt to remedy this problem, the Multiple SDE (MSDE) approach which combines multiple $\Sigma$-$\Delta$ estimators to calculate a hybrid background model has been developed. Besides the $\Sigma$-$\Delta$ filter technique, the Gaussian Mixture Model (GMM) has been widely used for robustly modeling backgrounds. Using the GMM model, each pixel value is modeled independently in one particular distribution, and a subsequent distribution of each pixel would be determined based on whether or not it belongs to the background. On the other hand, a simple background model is derived by the Simple Statistical Difference (SSD) method using the temporal average as the main criteria to accomplish the detection of moving vehicles. The Multiple Temporal difference (MTD) method retains several previous reference frames with which the differences between each frame would be calculated. This, in turn, shrinks gaps within the moving objects.

Unfortunately, video communication over real-world networks with limited bandwidths may frequently suffer from network congestions or bandwidth instabilities. This may be especially problematic when transmitting video information over wireless video communication systems. When data traffic congestions occur in a communication network, most users could tolerate a streaming video with a reduced quality rather than a video which lags or stands still. Therefore, a rate control scheme has been introduced as an effective video-coding tool for controlling the bit rate of video streams. To allocate the available amount of network bandwidth and produce variable bit-rate video streams, a rate control scheme would be used with the assistance of using H.264/AVC as an effective implement for video coding. Using this technique, variable bit-rate of video streams are produced to allow superior transmissions in wireless communication systems.

Nonetheless, although the rate-control scheme may increase the efficiency of video stream transmissions over networks with limited bandwidths, its tendency to continuously change bit rates may decrease the ease of detecting moving objects. Hence, the aforementioned state-of-the-art background subtraction methods in variable bit-rate video streams generally may not produce satisfactory detection results.

For example, FIGS. 1(*a*) and 1(*b*) show a same streaming video captured by a camera and transmitted over a wireless network. FIG. 1(*a*) is a frame numbered 550 and has a bit-rate of 1,000 pixels per second, and FIG. 1(*b*) is a frame numbered 918 and has a bit-rate of 2,000,000 pixels per second. FIG. 1(*a*) illustrates a pixel 101 of a tree along a road in the frame numbered 550, and FIG. 1(*b*) illustrates the same pixel 102 (i.e. in the same pixel location) displayed in the subsequent frame numbered 918 of the identical tree along the road as the frame numbered 550. FIG. 1(*c*) shows a comparison among data of the same abovementioned pixel from which its intensity variations in luminance (Y) component as time progresses. In this scenario, when the network bandwidth is sufficient, the rate control scheme would typically increase a low bit-rate video stream to a high bit-rate video stream in order to match the available network bandwidth. The background pixel value fluctuation 103 would often be misinterpreted as a moving object under a conventional background subtraction technique.

For another example, FIG. 2(*a*) shows a frame numbered 55 and has a bit-rate of 2,000,000 pixels per second, and FIG. 2(*b*) shows a frame numbered 209 and has a bit-rate of 1,000 pixels per second. FIG. 2(*a*) illustrates a pixel 201 of a tree on a road displayed in the frame numbered 55, and FIG. 2(*b*) illustrates the same pixel 202 (i.e. in the same pixel location)

displayed in the subsequent frame numbered 209 of a moving vehicle and the tree along the road. FIG. 2(c) shows a comparison among data of the same pixel from which its intensity variations in luminance (Y) component as time progresses. In this scenario, after the bit-rate is switched from a high-quality signal to a low-quality signal, the pixel value fluctuation would often disappear and the pixel value indicating a moving object 203 such as a moving vehicle would often be misinterpreted as a background object by using a conventional background subtraction technique.

In response to the aforementioned problem of misidentification resulted from fluctuating qualities of video stream transmission, a new scheme of moving object detection method is proposed in order to enhance the accuracy of image detection under the circumstance of having variation in bit-rate video streams over real-world networks with limited bandwidth.

SUMMARY

Accordingly, the present disclosure is directed to a method and an apparatus for moving object detection using a Cerebellar Model Articulation Controller (CMAC) network, and the present disclosure is able to distinguish a moving object in variable bit-rate video streams video streams in a low-cost digital implementation and an efficient manner.

The present disclosure is directed to a moving object detection method based on a CMAC network. The method includes the following steps: receiving a time series of incoming frames of a fixed location delivered over a network, where each pixel of the time series of incoming frames with a same pixel coordinate forms a time series of incoming pixels; constructing a CMAC network from the time series of incoming frames, where the CMAC network includes an input space, an association memory space, a weight memory space, and an output space, where the association memory space includes a plurality of physical memory addresses, and each of the time series of incoming pixels maps to one of the physical memory addresses, where the weight memory space includes a plurality lists of weight memory elements, each of the lists of weight memory elements is associated through one of the physical memory addresses, and each weight memory element in each of the lists of weight memory elements is associated with an pixel intensity value; receiving a current frame delivered over the network and partitioning the current frame into a plurality of current blocks; classifying each of the current blocks as either a background block or a moving object block according to the CMAC network; and determining whether a target pixel of the moving object blocks is a moving object pixel or a background pixel according to an output of the CMAC network in the output space.

According to an embodiment of the present disclosure, the step of constructing the CMAC network from the time series of incoming frames includes: calculating a probability of an occurrence of each of the pixel intensity values in each of the times series of incoming pixels so as to obtain a pmf evaluation corresponding to each of the pixel intensity values; and allocating each of the pmf evaluations to the corresponding weight memory element in the corresponding list of weight memory elements.

According to an embodiment of the present disclosure, the formulas for constructing the CMAC network from the time series of incoming frames include Eq.(1) and Eq.(2):

$$pmf(p_t) = \frac{n_{p_t}}{T} \qquad \text{Eq. (1)}$$

where $p_t$ is the pixel with the pixel coordinate (x, y), $n_{p_t}$ is the number of each of the pixel intensity values at the pixel coordinate (x, y) from each of the incoming frames $I_t$, T is the number of the incoming frames from the time series of incoming frames, and $pmf(p_t)$ is the pmf evaluation corresponding to each of the pixel intensity values at the pixel coordinate (x, y), $$B(x,y)_n = \{pmf(n) | n \in N^0 \cap n \leq M\} \qquad \text{Eq.(2)}$$

where pmf(n) is the pmf evaluation corresponding to the pixel intensity value n at the pixel coordinate (x, y), $N^0$ is a natural number space, and M is the maximum of the pixel intensity values.

According to an embodiment of the present disclosure, the step of classifying each of the current blocks as either the background block or the moving object block according to the CMAC network includes: inputting each of the current blocks into the input space; identifying a physical memory address of each pixel of each of the current blocks in the association memory space; associating the physical memory address of each of the pixels of each of the current blocks with the corresponding list of weight memory elements in the weight memory space; calculating a block summation corresponding to each of the current blocks according to the physical memory address and the list of weight memory elements of each of the pixels of the corresponding current block; determining if the block summation of each of the current blocks is less than a first threshold value; if yes, classifying the corresponding current block as the background block; and if no, classifying the corresponding current block as the moving object block.

According to an embodiment of the present disclosure, the formulas for classifying each of the current blocks as either the background block or the moving object block include Eq.(3)-Eq.(5):

$$C_Y(p_t) = [C_Y(p_t)_0, \ldots, C_Y(p_t)_{j+r}, \ldots, C_Y(p_t)_M] \qquad \text{Eq. (3)}$$

where $C_Y(p_t)$ is the physical memory address of the pixel at the pixel coordinate (x, y) in the current frame, where when $j = p_t$, the physical memory addresses are labelled as 1 in a range r, where $$|r| \leq \left\lfloor \frac{k}{2} \right\rfloor,$$

k is the number of the weight memory elements that the current pixel at the pixel coordinate (x, y) is associated with and k is a positive integer, $$\delta = \sum_{p_t \in \mu} \sum_{j=0}^{M} C_Y(p_t)_j W_j \qquad \text{Eq. (4)}$$

where $p_t$ represents each of the current pixels in the current block $\mu$, M is the maximum of the pixel intensity values, and $\delta$ is the block summation of the current block $\mu$, $$A = \begin{cases} 1, & \text{if } \delta < \varepsilon \\ 0, & \text{otherwise} \end{cases} \qquad \text{Eq. (5)}$$

where $\varepsilon$ is the first threshold value and is a real number, the current block A represents the moving object block when it is labelled as '1'.

According to an embodiment of the present disclosure, the step of determining whether the target pixel of the moving object blocks is the moving object pixel or the background pixel according to the output of the CMAC network in the output space includes: calculating the output of the CMAC network according to the physical memory address and the list of memory weight elements corresponding to the target pixel of the moving object blocks; determining if the output of the CMAC network is less than a second threshold value; if yes, determining that the target pixel is the moving object pixel; and if no, determining that the target pixel is the background object pixel.

According to an embodiment of the present disclosure, the formulas for determining whether the target pixel of the moving object blocks is the moving object pixel or the background pixel according to the output of the CMAC network in the output space include Eq.(6)-Eq.(7):

$$F = \sum_{j=0}^{M} C_Y(p_t)_j W_j \qquad \text{Eq. (6)}$$

where $C_Y$ is the physical memory address of the target pixel and W is the list of weight memory element associated with the physical memory address $C_Y$, $$Y(x, y) = \begin{cases} 1, & \text{if } F(x, y) < \Delta \\ 0, & \text{otherwise} \end{cases} \qquad \text{Eq. (7)}$$

where $\Delta$ is the second threshold value and is a real number, and Y(x, y) represents the moving object pixel when it is labelled as '1'.

The present disclosure is directed to a moving object detection apparatus including a processing unit and a storage unit, where the processing unit is coupled to the storage unit and is configured for: receiving a time series of incoming frames of a fixed location delivered over a network, where each pixel of the time series of incoming frames with a same pixel coordinate forms a time series of incoming pixels; constructing a CMAC network from the time series of incoming frames, where the CMAC network includes an input space, an association memory space, a weight memory space, and an output space, where the association memory space includes a plurality of physical memory addresses, and each of the time series of incoming pixels maps to one of the physical memory addresses, where the weight memory space includes a plurality lists of weight memory elements, each of the lists of weight memory elements is associated through one of the physical memory addresses, and each weight memory element in each of the lists of weight memory elements is associated with an pixel intensity value; receiving a current frame delivered over the network and partitioning the current frame into a plurality of current blocks; classifying each of the current blocks as either a background block or a moving object block according to the CMAC network; and determining whether a target pixel of the moving object blocks is a moving object pixel or a background pixel according to an output of the CMAC network in the output space.

According to an embodiment of the present disclosure, the processing unit is configured for: calculating a probability of an occurrence of each of the pixel intensity values in each of the times series of incoming pixels so as to obtain a pmf evaluation corresponding to each of the pixel intensity values; and allocating each of the pmf evaluations to the corresponding weight memory element in the corresponding list of weight memory elements.

According to an embodiment of the present disclosure, the processing unit is configured for constructing the CMAC network from the time series of incoming frames according to Eq.(1) and Eq.(2):

$$pmf(p_t) = \frac{n_{p_t}}{T} \qquad \text{Eq. (1)}$$

where $p_t$ is the pixel with the pixel coordinate (x, y), $n_{p_t}$ is the number of each of the pixel intensity values at the pixel coordinate (x, y) from each of the incoming frames $I_t$, T is the number of the incoming frames from the time series of incoming frames, and $pmf(p_t)$ is the pmf evaluation corresponding to each of the pixel intensity values at the pixel coordinate (x, y), $$B(x,y)_n = \{pmf(n) | n \in N^0 \cap n \leq M\} \qquad \text{Eq.(2)}$$

where pmf(n) is the pmf evaluation corresponding to the pixel intensity value n at the pixel coordinate (x, y), $N^0$ is a natural number space, and M is the maximum of the pixel intensity values.

According to an embodiment of the present disclosure, the processing unit is configured for: inputting each of the current blocks into the input space; identifying a physical memory address of each pixel of each of the current blocks in the association memory space; associating the physical memory address of each of the pixels of each of the current blocks with the corresponding list of weight memory elements in the weight memory space; calculating a block summation corresponding to each of the current blocks according to the physical memory address and the list of weight memory elements of each of the pixels of the corresponding current block; determining if the block summation of each of the current blocks is less than a first threshold value; if yes, classifying the corresponding current block as the background block; and if no, classifying the corresponding current block as the moving object block.

According to an embodiment of the present disclosure, the processing unit is configured for classifying each of the current blocks as either the background block or the moving object block according to the CMAC network based on Eq. (3)-Eq.(5):

$$C_Y(p_t) = \lfloor C_Y(p_t)_0, \ldots, C_Y(p_t)_{j+r}, \ldots, C_Y(p_t)_M \rfloor \qquad \text{Eq.(3)}$$

where $C_Y(p_t)$ is the physical memory address of the pixel at the pixel coordinate (x, y) in the current frame, where when $j=p_t$, the physical memory addresses are labelled as 1 in a range r, where $$|r| \leq \left\lfloor \frac{k}{2} \right\rfloor,$$

k is the number of the weight memory elements that the current pixel at the pixel coordinate (x, y) is associated with and k is a positive integer, $$\delta = \sum_{p_t \in \mu} \sum_{j=0}^{M} C_Y(p_t)_j W_j \quad \text{Eq. (4)}$$

where $p_t$ represents each of the current pixels in the current block $\mu$, M is the maximum of the pixel intensity values, and $\delta$ is the block summation of the current block $\mu$, $$A = \begin{cases} 1, & \text{if } \delta < \varepsilon \\ 0, & \text{otherwise} \end{cases} \quad \text{Eq. (5)}$$

where $\varepsilon$ is the first threshold value and is a real number, the current block A represents the moving object block when it is labelled as '1'.

According to an embodiment of the present disclosure, the processing unit is configured for calculating the output of the CMAC network according to the physical memory address and the list of memory weight elements corresponding to the target pixel of the moving object blocks; determining if the output of the CMAC network is less than a second threshold value; if yes, determining that the target pixel is the moving object pixel; and if no, determining that the target pixel is the background object pixel.

According to an embodiment of the present disclosure, the processing unit is configured for determining whether the target pixel of the moving object blocks is the moving object pixel or the background pixel according to the output of the CMAC network in the output space according to Eq.(6)-Eq. (7):

$$F = \sum_{j=0}^{M} C_Y(p_t)_j W_j \quad \text{Eq. (6)}$$

where $C_Y$ is the physical memory address of the target pixel and W is the list of weight memory element associated with the physical memory address $C_Y$, $$Y(x, y) = \begin{cases} 1, & \text{if } F(x, y) < \Delta \\ 0, & \text{otherwise} \end{cases} \quad \text{Eq. (7)}$$

where $\Delta$ is the second threshold value and is a real number, and Y(x, y) represents the moving object pixel when it is labelled as '1'.

In view of the aforementioned descriptions, the present disclosure is able to attain complete and accurate detection of moving objects in both high and low bit-rate video streams over real-world networks with limited bandwidth which feature realistic situations through a CMAC network in a low-cost digital implementation and an efficient manner.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
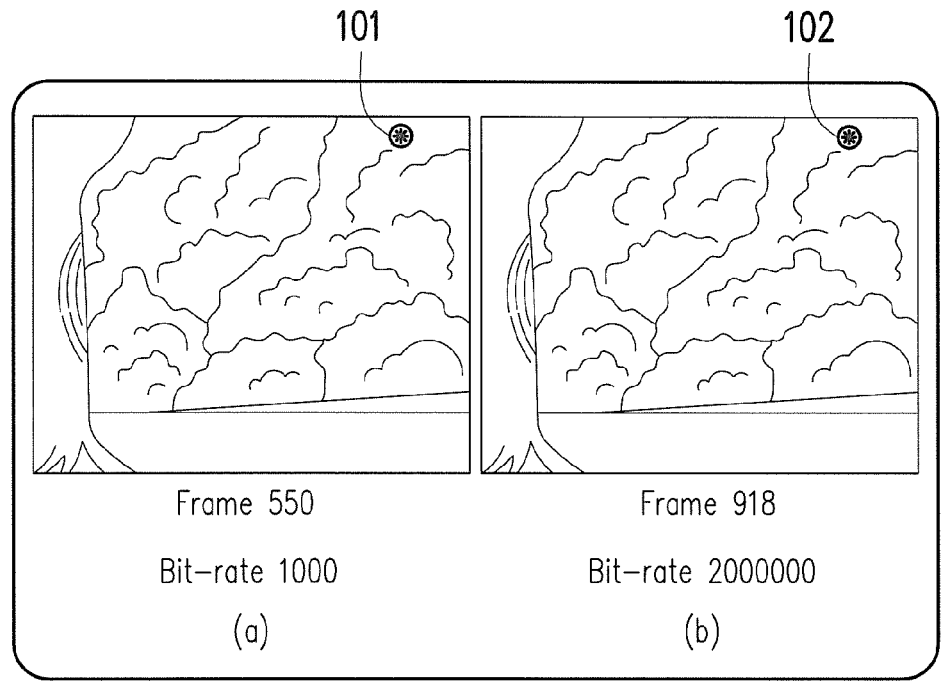
FIG. 1(a)-FIG. 1(c) illustrate an exemplary scenario in which intensity variations of a same pixel has shifted from having a low bit-rate to a high bit-rate in a video stream.
Figure 1:
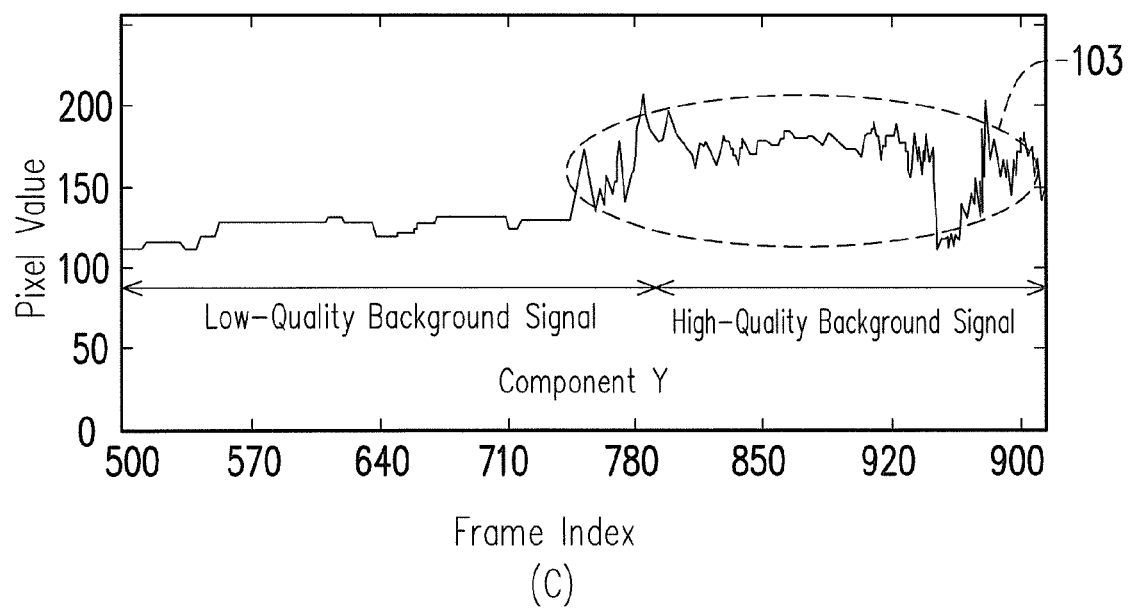
Figure 2:
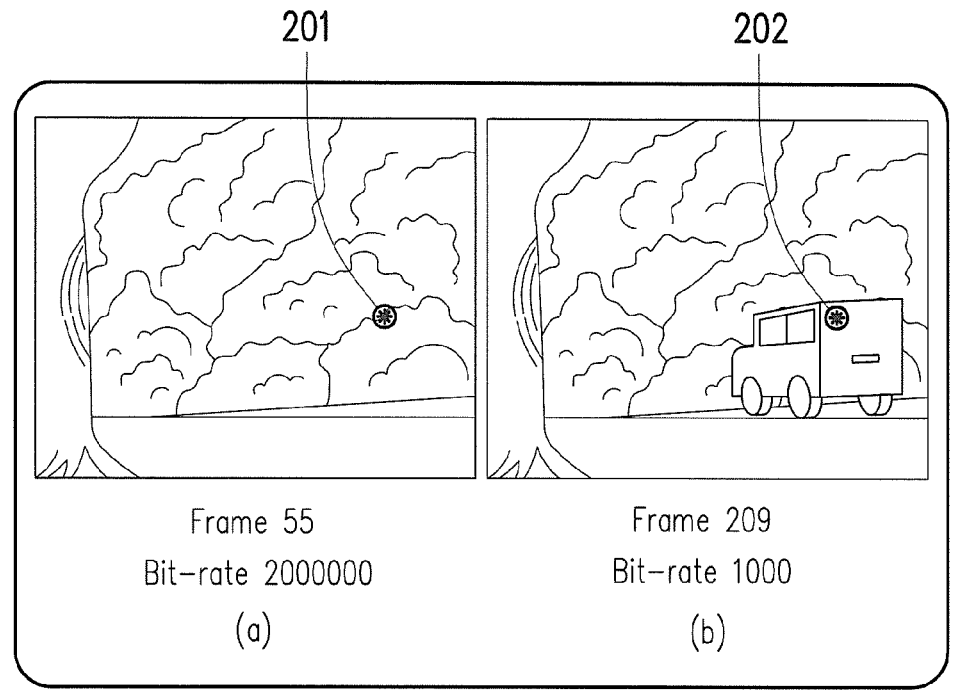
FIG. 2(a)-FIG. 2(c) illustrate an exemplary scenario in which intensity variations of a same pixel has shifted from having a high bit-rate to a low bit-rate in a video stream.
Figure 2:
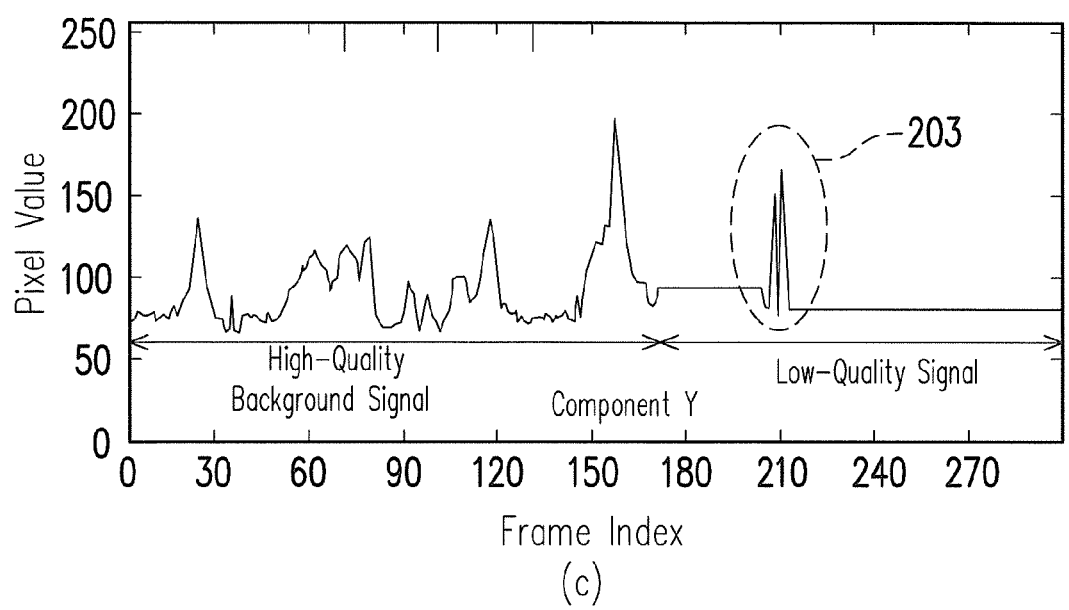

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

Figure 3:
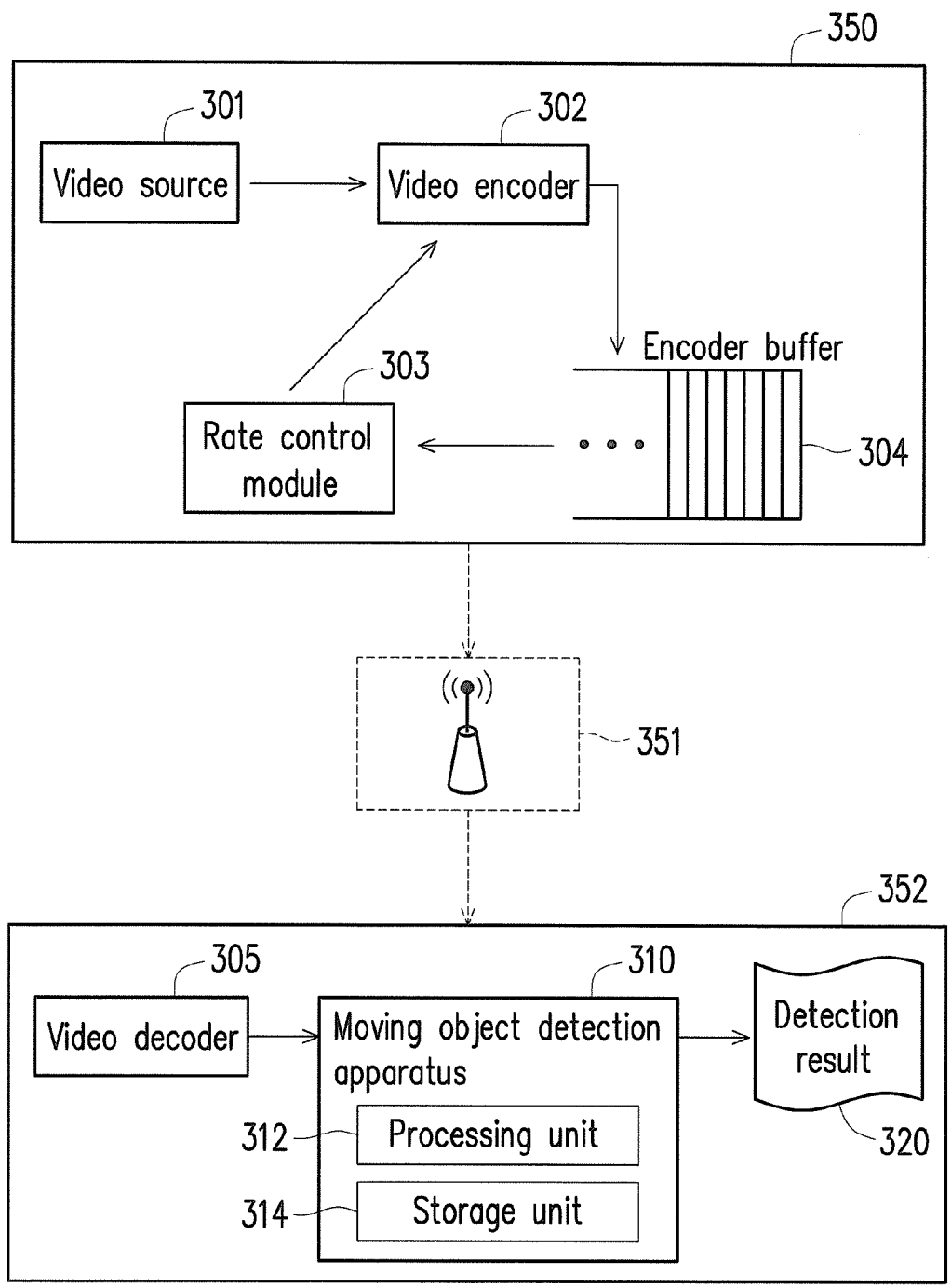
FIG. 3 illustrates an exemplary system architecture which utilizes the proposed method from the hardware perspective in accordance with one of the exemplary embodiments of the present disclosure.

FIG. 3 illustrates an exemplary system architecture which utilizes the proposed moving object detection method from the hardware perspective in accordance with one of the exemplary embodiments of the present disclosure. A typical system for moving object detection could be deployed in a traffic management system to detect traffic volume or a particular vehicle or could be deployed in an airport or shopping center for security purposes. The exemplary system of FIG. 3 may include a recording platform 350 and an analysis platform 352. The recording platform 350 may include a video source 301 which is an apparatus for capturing videos or motion pictures such as one or more surveillance cameras. The video source 301 would output captured raw footage to a video encoder 302 which would typically be controlled by a rate control module 303. The video encoder 302 would output encoded video to an encoder buffer 304 which would interact with the rate control module 303 to control the video encoder 302. The recording platform 350 would then output encoded videos to a network 351 by going through a wireless connection or a cable connection. The network 351 could be a 3G or LTE network connected to a core network, or the network could be an intranet or a private network. The encoded videos would then be received by the analysis platform 352. The analysis platform 352 would include a video decoder 305 which decodes received encoded videos from the network 351 through a transceiver, and the decoded videos would then be transferred to a moving object detection apparatus 310 which would then output analyzed detection result 320.

It should be mentioned that the moving object detection apparatus 310 would typically be performed as a part of the video encoder 302 within the recording platform 350; however the present disclosure would also propose that the moving object detection apparatus 310 be implemented after the video decoder 305. The advantage of doing so is that the moving object detection method could be performed for video of any specifications as opposed to videos having to adhere to a particular type of specification. The moving object detection apparatus 310 could be an electronic device having a processing unit 312 and a storage unit 314. The processing unit 312 may be one or a combination of a central processing unit (CPU), a programmable general- or specific-purpose microprocessor, a digital signal processor (DSP), a programmable controller, application specific integrated circuits (ASIC), a programmable logic device (PLD), or any other similar devices. The storage unit 314 may be one or a combination of a stationary or mobile random access memory (RAM), read-only memory (ROM), flash memory, hard disk, or any other similar devices. The processing unit 312 is coupled to the storage unit 314, where the processing unit 312 would be used to perform the moving object detection method as proposed, and the storage unit 314 would provide a temporary or permanent storage mean for the analysis platform 352.

Figure 4:
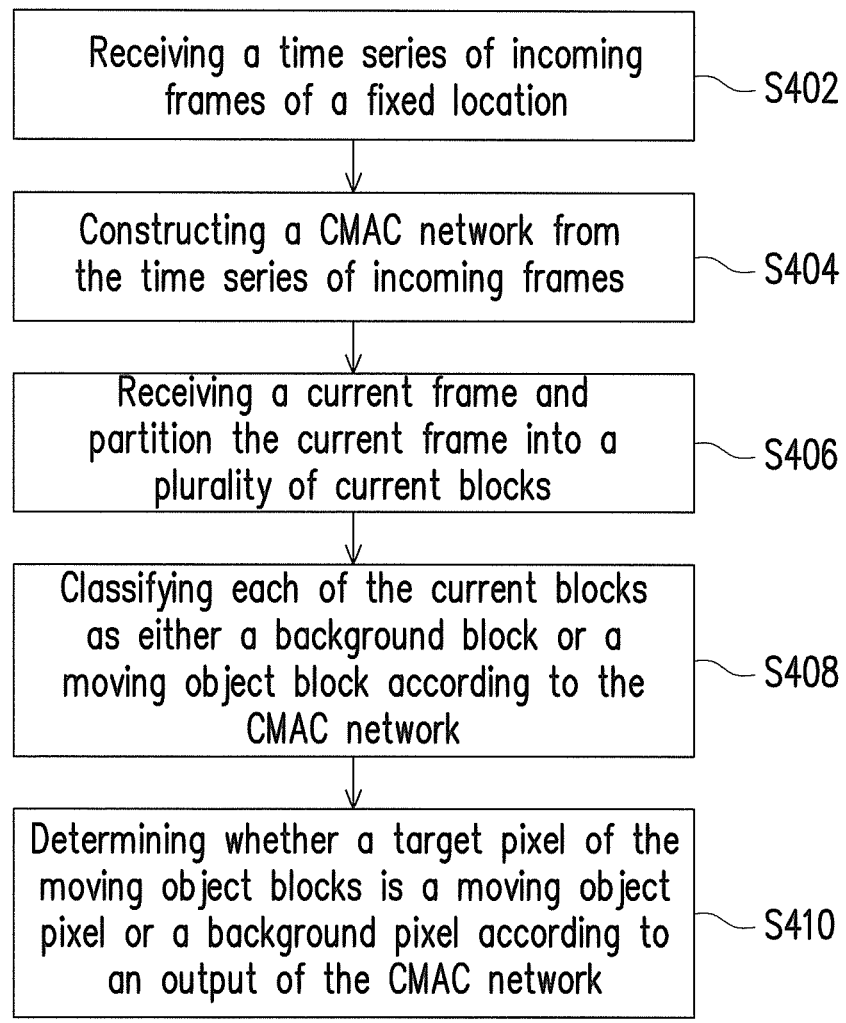
FIG. 4 illustrates a flowchart of a moving objection detection method in accordance with one of the exemplary embodiments of the present disclosure.

FIG. 4 illustrates a flowchart of a moving objection detection method in accordance with one of the exemplary embodiments of the present disclosure. The method proposed in the present embodiment may be performed by the moving object detection apparatus 310 of FIG. 3.

Referring to both FIG. 3 and FIG. 4, the processing unit 312 of the moving object detection apparatus 310 may receive a time series of incoming frames of a fixed location (Step S402). In other words, an input of an original video frame series (i.e. decoded video series obtained from the video decoder 305) would be received by the processing unit 312. For any particular spot where images are continuously being captured, the background could be assumed to be fixed.

In the present embodiment, the proposed method is built in $YC_bC_r$ color space to provide support for most digital video applications, where the luminance component (Y) determines the intensity of each pixel of each incoming frame $I_t$ in the time series of incoming frames. The processing unit 312 may construct a Cerebellar Model Articulation Controller (CMAC) network from the time series of incoming frames (Step S404). The properties of variable bit-rate video streams may be accommodated by a probabilistic background model for creation of the CMAC network. Thus, Step S404 is also referred to as "a probabilistic background generation stage."

Figure 5:
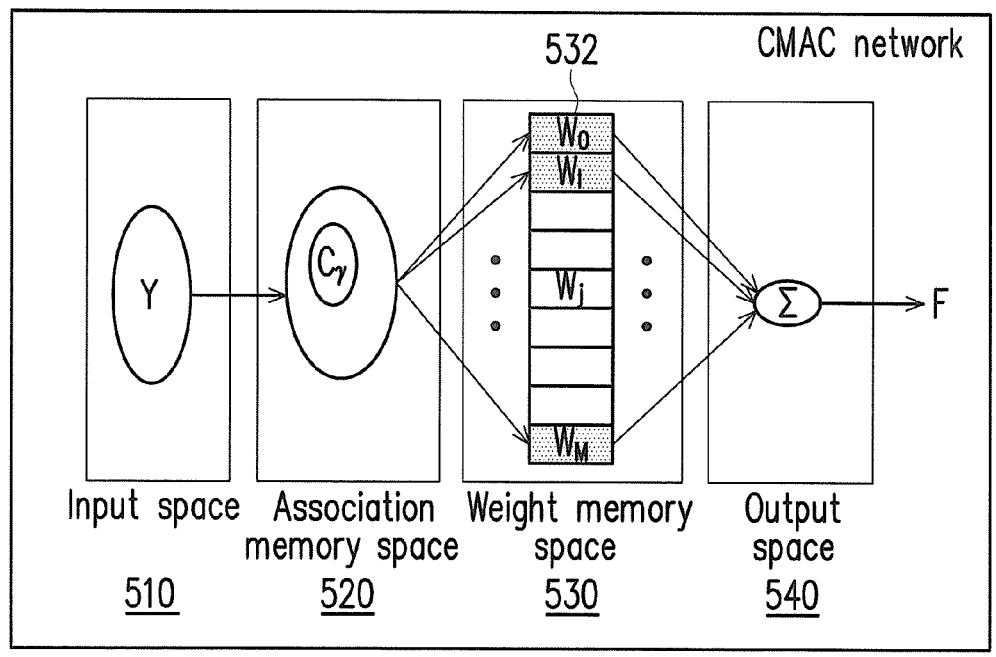
FIG. 5 illustrates a architecture of a CMAC network in accordance with one of the exemplary embodiments of the present disclosure.

FIG. 5 illustrates the architecture of the CMAC network in accordance with one of the exemplary embodiments of the present disclosure. Referring to FIG. 5, a CMAC network 500 would include an input space 510, an association memory space 520, a weight memory space 530, and an output space 540. The association memory space 520 would include a plurality of physical memory addresses. The weight memory space 530 would include a plurality lists of weight memory elements. Each of the lists of weight memory elements is associated through one of the physical memory addresses. In the present embodiment, only one list of weight memory elements 532 will be illustrated for simplicity.

The processing unit 312 may construct the CMAC network by first defining the weight memory elements of the lists of weight memory elements through a probability mass function (pmf) evaluation from a time series of incoming pixels. It is noted that, a time series of incoming pixels is formed by each pixel in the time series of incoming frames with a same pixel coordinate. Each of the time series of incoming pixels maps to one of the physical memory addresses in the association memory space 520. Assume that the list of weight memory elements 532 in the weight memory space 530 may be associated through the physical memory address $C_Y$ in the association memory space 520, where the physical memory address $C_Y$ corresponds to the time series of incoming pixels with the pixel coordinate (x, y), i.e. the pixel with the pixel coordinate (x, y) of every incoming frame $I_t$, which may be defined as an input state Y.

Each of the pmf evaluations is defined as the probability of an occurrence of each of the pixel intensity values in each of the times series of incoming pixels. The processing unit 312 may calculate the pmf evaluations according to Eq.(1):

$$pmf(p_i) = \frac{n_{p_t}}{T} \qquad \text{Eq. (1)}$$

where $p_t$ is the pixel at the pixel coordinate (x, y), $n_{p_t}$ is the number of each of the pixel intensity values at the pixel coordinate (x, y) from the time series of incoming frames $I_t$, T is the number of the incoming frames from the time series of incoming frames, and $pmf(p_t)$ is the pmf evaluation corresponding to the pixel coordinate (x, y).

The processing unit 312 may then allocate each of the pmf evaluations to the corresponding weight memory element $W(x, y)_0, \ldots, W(x, y)_M$ in the corresponding list of weight memory elements 532 according to Eq.(2):

$$B(x,y)_n = \{pmf(n) | n \in N^0 \cap n \leq M\} \qquad \text{Eq.(2)}$$

where pmf(n) is the pmf evaluation corresponding to the pixel intensity value n at the pixel coordinate (x, y), $N^0$ is a natural number space, and M is the maximum of the pixel intensity values, where $B(x, y)_n$ may be viewed as the aforementioned probabilistic background model. The probabilistic background generation stage may be regarded as an unsupervised learning process. After the probabilistic background generation stage is completed, moving objects may be detected accurately in video streams of both low and high bit-rate in a moving object detection stage discussed hereinafter.

Revisiting FIG. 4, after the processing unit 312 constructs the CMAC network in the probabilistic background generation stage, each pixel $p_t(x, y)$ in a current frame is delivered to the input space of the CMAC network in the $YC_bC_r$ color space. In the present embodiment, the current frame may be the next frame received after the aforementioned time series of incoming frames. It should be noted that, moving objects detected by some existing methods during low-to-high bit-rate variation normally exhibit serious artifact generation due to misjudgment of most background signals as belonging to moving objects in high bit-rate environments. To remedy such problem, after the structure of the CMAC network is established, the processing unit 312 may receive a current frame and partition the current frame into a plurality of current blocks (Step S406).

The processing unit 312 may divide the current frame into N×N current blocks for eliminating unnecessary current blocks, which are indicated as belonging to the background class. Note that the block size N herein may also be empirically set to 16. Thus, at this point, the processing unit 312 may classifying each of the current blocks as either a background block or a moving object block according to the background model (Step S408, referred to as "a block selection procedure").

In the CMAC network, since each of the weight memory elements would be associated through a physical memory address in the association memory space after each of the pixels $p_t(x, y)$ is added to the input space, the processing unit 312 may associate the physical memory address of each of the pixels of each of the current blocks with the corresponding list of weight memory elements in the weight memory space according to Eq.(3):

$$C_Y(p_t) = [C_Y(p_t)_0, \ldots, C_Y(p_t)_{j+r}, \ldots, C_Y(p_t)_M] \quad \text{Eq.(3)}$$

where $C_Y(p_t)$ is the physical memory address of the pixel at the pixel coordinate (x, y), where when $j=p_t$, the physical memory addresses are labelled as 1 in a range r, where $$|r| \leq \left\lfloor \frac{k}{2} \right\rfloor,$$

k is the number of the weight memory elements that the current pixel at the pixel coordinate is associated with and k is a positive integer.

Figure 6:
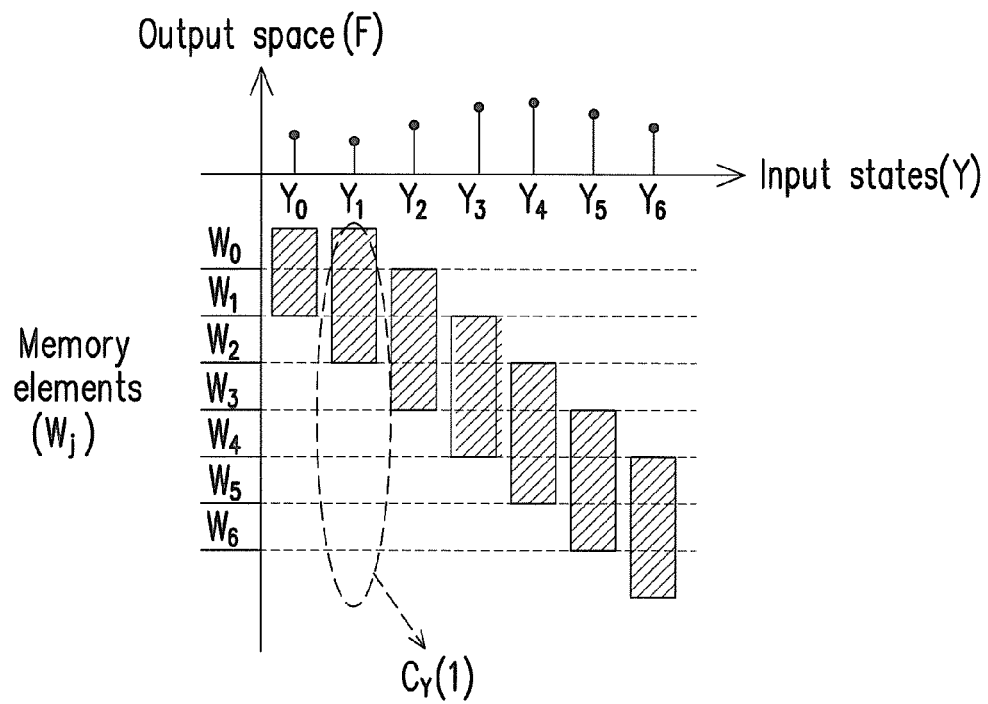
FIG. 6 illustrates the division of the physical memory addresses in the CMAC network in accordance with one of the exemplary embodiments of the present disclosure.

For example, FIG. 6 illustrates the division of the physical memory addresses in the CMAC network. Referring to FIG. 6, assume that the input state $Y_1$ corresponding to the pixel $p_t(x, y)$ in the current frame is mapped onto the set $C_Y(1)$, where $C_Y(1)$ is the physical memory address of the pixel $p_t(x, y)$ and associates with three weight memory elements, i.e. j=1 and k=3. The physical memory address $C_Y(1)$ may be expressed as [1 1 1 0 0 0 0 0]. Thus, the pixel is associated with the weight memory elements $W(x, y)_0$, $W(x, y)_1$ and $W(x, y)_2$.

The block selection procedure in Step S408 may be done through calculating a block summation according to the physical memory address and the memory weight elements of each of the current pixels of each of the current blocks based on Eq.(4):

$$\delta = \sum_{p_t \in \mu} \sum_{j=0}^{M} C_Y(p_t)_j W_j \quad \text{Eq. (4)}$$

where $p_t$ represents each of the current pixels in the current block $\mu$, M is the maximum of the pixel intensity values, and $\delta$ is the block summation of the current block $\mu$. Referring to the example in FIG. 6, for the set $C_Y(1)$, the processing unit 312 may sum up the values of the weight memory elements $W(x, y)_0$, $W(x, y)_1$ and $W(x, y)_2$.

The processing unit 312 may determine if the block summation of each of the current blocks is less than a first threshold value. If yes, the processing unit 312 may classify the corresponding current block as the background block; if no, the processing unit 312 may classify the corresponding current block as the moving object block. Such decision rule may be expressed as Eq.(5):

$$A = \begin{cases} 1, & \text{if } \delta < \varepsilon \\ 0, & \text{otherwise} \end{cases} \quad \text{Eq. (5)}$$

where $\varepsilon$ is the first threshold value and is a real number, the current block A represents the moving object block when it is labelled as '1', which means that the current block A contains a greater profusion of pixels belonging to moving objects.

Once the processing unit 312 eliminates unnecessary current blocks through the proposed block selection procedure, complete and accurate motion detection may be accomplished efficiently using only the moving object block that are determined to contain moving object pixels. This may be achieved through an object detection procedure and may be performed in both low and high bit-rate video streams. As a consequence, the processing unit 312 may determine whether a target pixel of the moving object blocks is a moving object pixel or a background pixel according to an output of the background model (Step S410, referred to as "the object detection procedure").

To be specific, the output space of the CMAC network is used to compute a binary motion detection mask as the detection result. The processing unit 312 may first calculate the output of the CMAC network in the output space according to the physical memory address and the list of memory weight elements corresponding to the target pixel of the moving object blocks. In other words, the processing unit 312 may sum up the mapped weight memory elements in the weight memory space as the output of the CMAC network. The output of the CMAC network may be written as Eq.(6):

$$F = \sum_{j=0}^{M} C_Y(p_t)_j W_j \quad \text{Eq. (6)}$$

where $C_Y$ is the physical memory address of the target pixel and W is the list of weight memory element associated with the physical memory address $C_Y$.

Next, the processing unit 312 may determine if the output of the output space is less than a second threshold value. If the output of the CMAC network is less than the second threshold value, the processing unit 312 may determine that the target pixel is the moving object pixel; otherwise, the processing unit 312 may determine that the current pixel is the background pixel. Such decision rule may be written as Eq.(7):

$$Y(x, y) = \begin{cases} 1, & \text{if } F(x, y) < \Delta \\ 0, & \text{otherwise} \end{cases} \quad \text{Eq. (7)}$$

where $\Delta$ is the second threshold value and is a real number, and Y(x, y) represents the moving object pixel when it is labelled as '1'.

Figure 7:
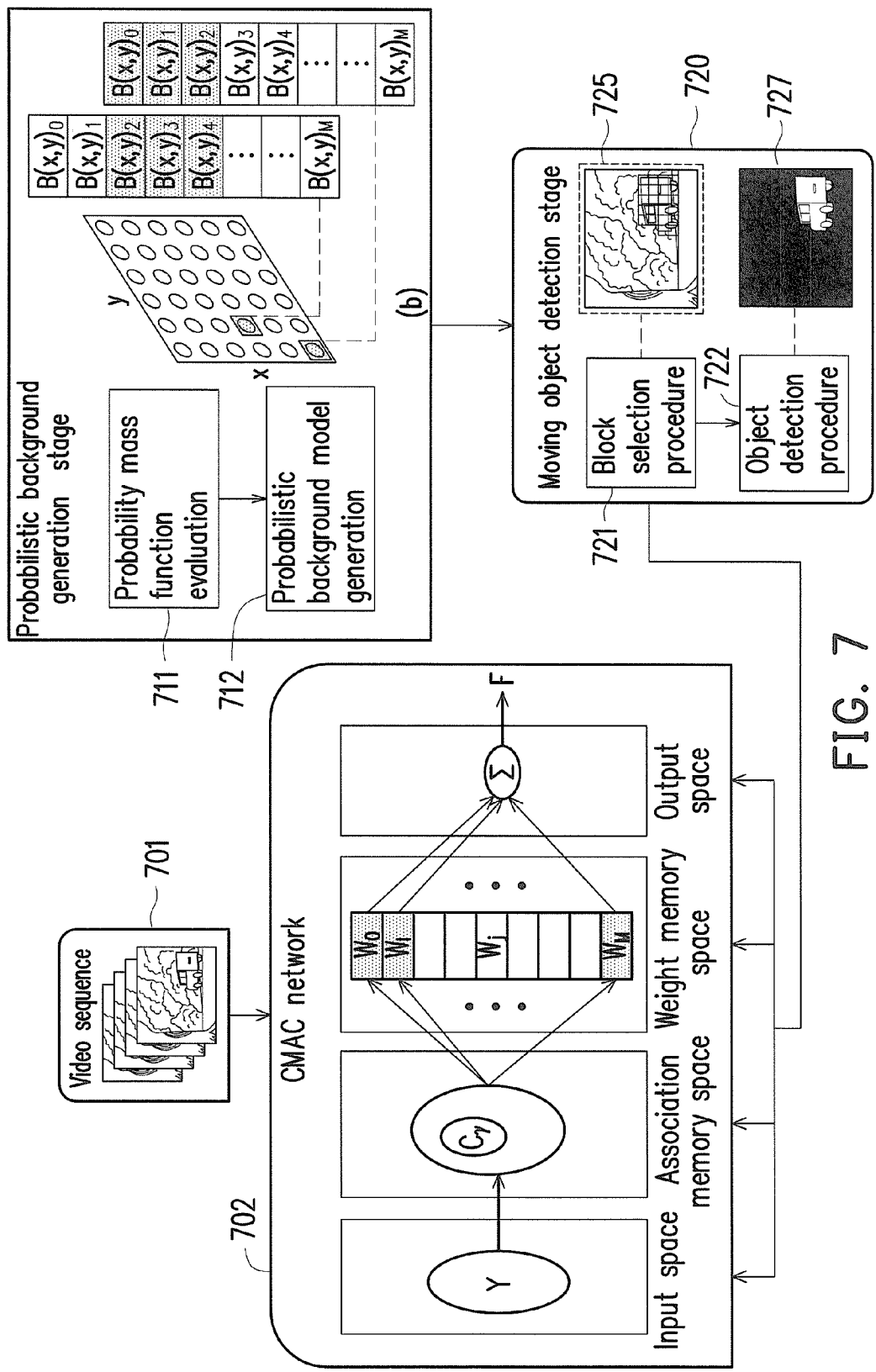
FIG. 7 illustrates a moving object detection method in terms of functional block diagrams in accordance with one of the exemplary embodiments of the present disclosure.

The proposed moving object detection method may be summarized by FIG. 7 in terms of functional block diagrams in accordance with one of the exemplary embodiments of the present disclosure. Referring to FIG. 7, the moving object detection method is arranged in two stages: a probabilistic background generation stage 710 and a moving object detection stage 720. The proposed method would take in a video sequence 701. A CMAC network 702 is constructed in the probabilistic background generation stage 710 so as to effectively accommodate the properties of variable bit-rate video streams. This may be accomplished by using the pmf evaluation from each time series of incoming pixels, whereupon it relays such information to the CMAC network 702 as weight memory elements in a weight memory space for creation of the CMAC network structure.

After the proposed CMAC network 702 is constructed in the probabilistic background generation stage 710, complete and accurate motion detection may be accomplished in a moving object detection stage 720, which consists of a block selection procedure 721 and an object detection procedure 722. The block selection procedure 721 may eliminate unnecessary blocks from equal-sized blocks of incoming frame (i.e. the aforementioned "current blocks") in which the block features are categorized as belonging to the background class and subsequently eliminated through the use of the CMAC network. Consequently, the background blocks are eliminated through the block selection procedure 721, and moving objection detection is only engaged for blocks 725 which are regarded as belonging to the moving objects class. This is achieved by using the object detection procedure 722 via the proposed CMAC network 702 and is capable of providing a complete and accurate detection result 727 in variable bit-rate video streams.

In view of the aforementioned descriptions, the present disclosure is able to attain complete and accurate detection of moving objects in both high and low bit-rate video streams over real-world networks with limited bandwidth which feature realistic situations through a CMAC network in a low-cost digital implementation and an efficient manner.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A moving object detection method based on a Cerebellar Model Articulation Controller (CMAC) network comprising:
   receiving a time series of incoming frames of a fixed location delivered over a network, wherein each pixel of the time series of incoming frames with a same pixel coordinate forms a time series of incoming pixels;
   constructing a CMAC network from the time series of incoming frames, wherein the CMAC network comprises an input space, an association memory space, a weight memory space, and an output space, wherein the association memory space comprises a plurality of physical memory addresses, and each of the time series of incoming pixels maps to one of the physical memory addresses, wherein the weight memory space comprises a plurality lists of weight memory elements, each of the lists of weight memory elements is associated through one of the physical memory addresses, and each weight memory element in each of the lists of weight memory elements is associated with an pixel intensity value;
   receiving a current frame delivered over the network and partitioning the current frame into a plurality of current blocks;
   classifying each of the current blocks as either a background block or a moving object block according to the CMAC network; and
   determining whether a target pixel of the moving object blocks is a moving object pixel or a background pixel according to an output of the CMAC network in the output space.

2. The method of claim 1, wherein the step of constructing the CMAC network from the time series of incoming frames comprises:
   calculating a probability of an occurrence of each of the pixel intensity values in each of the times series of incoming pixels so as to obtain a pmf evaluation corresponding to each of the pixel intensity values; and
   allocating each of the pmf evaluations to the corresponding weight memory element in the corresponding list of weight memory elements.

3. The method of claim 2, wherein the formulas for constructing the CMAC network from the time series of incoming frames comprise Eq.(1) and Eq.(2):

$$pmf(p_t) = \frac{n_{p_t}}{T} \qquad \text{Eq. (1)}$$

wherein $p_t$ is the pixel with the pixel coordinate (x, y), $n_{p_t}$ is the number of each of the pixel intensity values at the pixel coordinate (x, y) from each of the incoming frames $I_t$, T is the number of the incoming frames from the time series of incoming frames, and $pmf(p_t)$ is the pmf evaluation corresponding to each of the pixel intensity values at the pixel coordinate (x, y), $$B(x,y)_n = \{pmf(n) | n \in N^0 \cap n \leq M\} \qquad \text{Eq.(2)}$$

wherein pmf(n) is the pmf evaluation corresponding to the pixel intensity value n at the pixel coordinate (x, y), $N^0$ is a natural number space, and M is the maximum of the pixel intensity values.

4. The method of claim 1, wherein the step of classifying each of the current blocks as either the background block or the moving object block according to the CMAC network comprises:
   inputting each of the current blocks into the input space;
   identifying a physical memory address of each pixel of each of the current blocks in the association memory space;
   associating the physical memory address of each of the pixels of each of the current blocks with the corresponding list of weight memory elements in the weight memory space;
   calculating a block summation corresponding to each of the current blocks according to the physical memory address and the list of weight memory elements of each of the pixels of the corresponding current block;
   determining if the block summation of each of the current blocks is less than a first threshold value;
   if yes, classifying the corresponding current block as the background block; and
   if no, classifying the corresponding current block as the moving object block.

5. The method of claim 4, wherein the formulas for classifying each of the current blocks as either the background block or the moving object block comprise Eq.(3)-Eq.(5):

$$C_Y(p_t) = \lfloor C_Y(p_t)_0, \ldots, C_Y(p_t)_{j+r}, \ldots, C_Y(p_t)_M \rfloor \quad \text{Eq.(3)}$$

wherein $C_Y(p_t)$ is the physical memory address of the pixel at the pixel coordinate (x, y) in the current frame, wherein when $j=p_t$, the physical memory addresses are labelled as '1' in a range r, where $$|r| \leq \left\lfloor \frac{k}{2} \right\rfloor,$$

k is the number of the weight memory elements that the current pixel at the pixel coordinate (x, y) is associated with and k is a positive integer, $$\delta = \sum_{p_t \in \mu} \sum_{j=0}^{M} C_Y(p_t)_j W_j \quad \text{Eq. (4)}$$

wherein $p_t$ represents each of the current pixels in the current block $\mu$, M is the maximum of the pixel intensity values, and $\delta$ is the block summation of the current block $\mu$, $$A = \begin{cases} 1, & \text{if } \delta < \varepsilon \\ 0, & \text{otherwise} \end{cases} \quad \text{Eq. (5)}$$

wherein $\varepsilon$ is the first threshold value and is a real number, and the current block A represents the moving object block when it is labelled as '1'.

6. The method of claim 4, wherein the step of determining whether the target pixel of the moving object blocks is the moving object pixel or the background pixel according to the output of the CMAC network in the output space comprises:
calculating the output of the CMAC network according to the physical memory address and the list of memory weight elements corresponding to the target pixel of the moving object blocks;
determining if the output of the CMAC network is less than a second threshold value;
if yes, determining that the target pixel is the moving object pixel; and
if no, determining that the target pixel is the background object pixel.

7. The method of claim 6, wherein the formulas for determining whether the target pixel of the moving object blocks is the moving object pixel or the background pixel according to the output of the CMAC network in the output space comprise Eq.(6)-Eq.(7):

$$F = \sum_{j=0}^{M} C_Y(p_t)_j W_j \quad \text{Eq. (6)}$$

where $C_Y$ is the physical memory address of the target pixel and W is the list of weight memory element associated with the physical memory address $C_Y$, $$Y(x, y) = \begin{cases} 1, & \text{if } F(x, y) < \Delta \\ 0, & \text{otherwise} \end{cases} \quad \text{Eq. (7)}$$

wherein $\Delta$ is the second threshold value and is a real number, and Y(x, y) represents the moving object pixel when it is labelled as '1'.

8. A moving object detection apparatus, comprising a processing unit and a storage unit, wherein the processing unit is coupled to the storage unit and is configured for:
receiving a time series of incoming frames of a fixed location delivered over a network, wherein each pixel of the time series of incoming frames with a same pixel coordinate forms a time series of incoming pixels;
constructing a CMAC network from the time series of incoming frames, wherein the CMAC network comprises an input space, an association memory space, a weight memory space, and an output space, wherein the association memory space comprises a plurality of physical memory addresses, and each of the time series of incoming pixels maps to one of the physical memory addresses, wherein the weight memory space comprises a plurality lists of weight memory elements, each of the lists of weight memory elements is associated through one of the physical memory addresses, and each weight memory element in each of the lists of weight memory elements is associated with an pixel intensity value;
receiving a current frame delivered over the network and partitioning the current frame into a plurality of current blocks;
classifying each of the current blocks as either a background block or a moving object block according to the CMAC network; and
determining whether a target pixel of the moving object blocks is a moving object pixel or a background pixel according to an output of the CMAC network in the output space.

9. The apparatus of claim 8, wherein the processing unit is configured for constructing the CMAC network from the time series of incoming frames comprising:
calculating a probability of an occurrence of each of the pixel intensity values in each of the times series of incoming pixels so as to obtain a pmf evaluation corresponding to each of the pixel intensity values; and
allocating each of the pmf evaluations to the corresponding weight memory element in the corresponding list of weight memory elements.

10. The apparatus of claim 9, wherein the processing unit is configured for constructing the CMAC network from the time series of incoming frames according to Eq.(1) and Eq.(2):

$$pmf(p_t) = \frac{n_{p_t}}{T} \quad \text{Eq. (1)}$$

wherein $p_t$ is the pixel with the pixel coordinate (x, y), $n_{p_t}$ is the number of each of the pixel intensity values at the pixel coordinate (x, y) from each of the incoming frames $I_t$, T is the number of the incoming frames from the time series of incoming frames, and $pmf(p_t)$ is the pmf evaluation corresponding to each of the pixel intensity values at the pixel coordinate (x, y), $$B(x,y)_n = \{pmf(n) | n \in N^0 \cap n \leq M\} \quad \text{Eq.(2)}$$

wherein pmf(n) is the pmf evaluation corresponding to the pixel intensity value n at the pixel coordinate (x, y), $N^o$ is a natural number space, and M is the maximum of the pixel intensity values.

11. The apparatus of claim 8, wherein the processing unit is configured for classifying each of the current blocks as either the background block or the moving object block according to the CMAC network comprising:

inputting each of the current blocks into the input space;

identifying a physical memory address of each pixel of each of the current blocks in the association memory space;

associating the physical memory address of each of the pixels of each of the current blocks with the corresponding list of weight memory elements in the weight memory space;

calculating a block summation corresponding to each of the current blocks according to the physical memory address and the list of weight memory elements of each of the pixels of the corresponding current block;

determining if the block summation of each of the current blocks is less than a first threshold value;

if yes, classifying the corresponding current block as the background block; and if no, classifying the corresponding current block as the moving object block.

12. The apparatus of claim 11, wherein the processing unit is configured for classifying each of the current blocks as either the background block or the moving object block according to the CMAC network based on Eq.(3)-Eq.(5):

$$C_Y(p_t) = \lfloor C_Y(p_t)_0, \ldots, C_Y(p_t)_{j+r}, \ldots, C_Y(p_t)_M \rfloor \quad \text{Eq.(3)}$$

wherein $C_Y(p_t)$ is the physical memory address of the pixel at the pixel coordinate (x, y) in the current frame, wherein when $j=p_t$, the physical memory addresses are labelled as 1 in a range r, where $$|r| \leq \left\lfloor \frac{k}{2} \right\rfloor,$$

k is the number of the weight memory elements that the current pixel at the pixel coordinate (x, y) is associated with and k is a positive integer, $$\delta = \sum_{p_t \in \mu} \sum_{j=0}^{M} C_Y(p_t)_j W_j \quad \text{Eq.(4)}$$

wherein $p_t$ represents each of the current pixels in the current block μ, M is the maximum of the pixel intensity values, and δ is the block summation of the current block μ, $$A = \begin{cases} 1, & \text{if } \delta < \varepsilon \\ 0, & \text{otherwise} \end{cases} \quad \text{Eq.(5)}$$

wherein ε is the first threshold value and is a real number, the current block A represents the moving object block when it is labelled as '1'.

13. The apparatus of claim 11, wherein the processing unit is configured for determining whether the target pixel of the moving object blocks is the moving object pixel or the background pixel according to the output of the CMAC network in the output space comprising:

calculating the output of the CMAC network according to the physical memory address and the list of memory weight elements corresponding to the target pixel of the moving object blocks;

determining if the output of the CMAC network is less than a second threshold value;

if yes, determining that the target pixel is the moving object pixel; and if no, determining that the target pixel is the background object pixel.

14. The apparatus of claim 11, wherein the processing unit is configured for determining whether the target pixel of the moving object blocks is the moving object pixel or the background pixel according to the output of the CMAC network in the output space according to Eq.(6)-Eq.(7):

$$F = \sum_{j=0}^{M} C_Y(p_t)_j W_j \quad \text{Eq.(6)}$$

where $C_Y$ is the physical memory address of the target pixel and W is the list of weight memory element associated with the physical memory address $C_Y$, $$Y(x, y) = \begin{cases} 1, & \text{if } F(x, y) < \Delta \\ 0, & \text{otherwise} \end{cases} \quad \text{Eq.(7)}$$

wherein Δ is the second threshold value and is a real number, and Y(x, y) represents the moving object pixel when it is labelled as '1'.

* * * * *